(12) United States Patent
Leyendecker et al.

(10) Patent No.: US 9,287,932 B2
(45) Date of Patent: Mar. 15, 2016

(54) STAND-BY POWER MODE FOR POWER LINE MODEM

(75) Inventors: Philippe Leyendecker, Chateaugiron (FR); Jean-Yves Moraillon, Cesson Sévigné (FR); Philippe Marchand, Vitré (FR)

(73) Assignee: Thomson Licensing, Boulogne, Billancourt (FR)

( * ) Notice: Subject to any disclaimer, the term of this patent is extended or adjusted under 35 U.S.C. 154(b) by 557 days.

(21) Appl. No.: 13/318,696

(22) PCT Filed: May 7, 2010

(86) PCT No.: PCT/EP2010/056267
§ 371 (c)(1),
(2), (4) Date: Nov. 3, 2011

(87) PCT Pub. No.: WO2010/133456
PCT Pub. Date: Nov. 25, 2010

(65) Prior Publication Data
US 2012/0049655 A1    Mar. 1, 2012

(30) Foreign Application Priority Data
May 19, 2009    (EP) ..................................... 09305461

(51) Int. Cl.
*H02B 1/24*    (2006.01)
*H04B 3/54*    (2006.01)

(52) U.S. Cl.
CPC .......... *H04B 3/54* (2013.01); *H04B 2203/5454* (2013.01); *Y10T 307/865* (2015.04)

(58) Field of Classification Search
USPC .................... 307/31, 39, 66, 82, 83, 150, 131
See application file for complete search history.

(56) References Cited

U.S. PATENT DOCUMENTS

| | | | |
|---|---|---|---|
| 2003/0020441 A1* | 1/2003 | Yanagisawa ................... | 323/282 |
| 2005/0281326 A1* | 12/2005 | Yu ............................ | H04B 3/44 |
| | | | 375/222 |
| 2009/0096592 A1* | 4/2009 | Wu et al. ................... | 340/310.12 |
| 2011/0221578 A1* | 9/2011 | Sekiguchi .......... | G06K 19/0704 |
| | | | 340/10.42 |

FOREIGN PATENT DOCUMENTS

| EP | 0804026 | 10/1997 |
|---|---|---|
| EP | 200965265 | 3/2009 |
| KR | 100822342 | * 4/2008 |

OTHER PUBLICATIONS

Search Report Dated Jul. 1, 2010.

* cited by examiner

*Primary Examiner* — Rexford Barnie
*Assistant Examiner* — Xuan Ly
(74) *Attorney, Agent, or Firm* — Jeffrey D. Carter

(57) ABSTRACT

The external power supply comprises a modem, a power source for providing an operating voltage for the modem and a supply voltage for an appliance and a power safe control. The power safe control comprises a current sense element for sensing a supply current of the supply voltage and a threshold circuit coupled to the current sense element for switching off the operating voltage when the supply current is below a threshold value, and for switching on the operating voltage when the supply current is above the threshold value. The appliance is in a preferred embodiment a residential gateway or a set-top box and the modem a power line communication modem.

20 Claims, 5 Drawing Sheets

STAND-BY POWER MODE FOR POWER LINE MODEM

This application claims the benefit, under 35 U.S.C. §365 of International Application PCT/EP2010/056267, filed May 7, 2010, which was published in accordance with PCT Article 21(2) on Nov. 25, 2010 in English and which claims the benefit of European patent application No. 09305461.7, filed May 19, 2009.

TECHNICAL FIELD OF THE INVENTION

The present invention relates to an external power supply for an appliance, the external power supply comprising a modem and a power source providing an operating voltage for the modem and a supply voltage for the appliance. The modem is in particular a power line communication modem for data transmission and/or data reception via the mains power line.

BACKGROUND OF THE INVENTION

External power supplies for appliances are widely used to adapt an appliance easily to different power sockets by providing the appliance with a respective external power supply. External power supplies are also known as AC-adapter, plug-pack, power adapter or DC-Pack. Other reasons to use an external power supply are reduced size and costs of the appliance and for making an appliance for international sale with a variety of external power supplies.

Power line communication (PLC) is getting more and more popular as data transmission for Home Networking Technology. Power line communication is used e.g. for home devices like residential gateways or set-top boxes having an external power supply. Combining the external power supply with a power line communication modem into a single device has the advantage of reduced costs and reduced size of the appliance. A disadvantage of such a solution is that the power line modem is always on and consuming power, even when the appliance is switched off. Due to environmental reasons, there are therefore regulations in discussion for reducing power consumption in external power supplies. For example EU regulation No. 1275/2008 requires to reduce the standby energy consumption of consumer appliances below 1 Watt within the next years.

JP-A-2009-065265 discloses an office apparatus comprising an external power supply including a power line communication modem, which external power supply can be switched off and correspondingly the modem by means of a mains switch at the apparatus. A disadvantage is that a second power supply within the apparatus and a second power line to the apparatus are required. In another embodiment, the external power supply includes a current detection part detecting a current value flowing through the power line to the apparatus and the modem includes a microcontroller coupled to the current detection part for detecting when a power saving reset switch is pushed at the apparatus. The microcontroller recognizes also when the mains switch at the apparatus is switched off based on the current detection result of the current detection part, for reducing the power consumption of the apparatus.

EP-A-0804026 describes a separate box arranged between the mains supply and a consumer appliance, which box comprises a resistor as a current detector, a relay, a threshold detection circuit and an infrared detector, for switching off the mains voltage for the appliance with a delay, when the appliance is in a standby mode, and which switches on the mains voltage for the appliance in case signals of any remote control are received.

BRIEF SUMMARY OF THE INVENTION

The external power supply according to the present invention comprises a modem, a power save control and a power source for providing an operating voltage for the modem and a supply voltage for an appliance. The power save control comprises a current sense element for sensing a supply current of the supply voltage for the appliance and comprises a threshold circuit coupled to the current sense element, the threshold circuit switching on the modem, when the supply current is above a threshold value, and switching off the modem, when the supply current is below a threshold value. The threshold circuit is in particular adjusted such that the operating voltage for the modem is switched off, when the appliance is in a standby mode or in an off mode.

In a preferred embodiment, the power safe control comprises a switching element, to which an output of the threshold circuit is coupled for switching the modem on and off by switching on and off the operating voltage for the modem, and comprises a timer circuit for switching the modem off with a delay, when the supply current for the appliance is below the threshold value. The current sense element comprises advantageously a resistor, the threshold circuit a comparator coupled to a reference voltage and the switching element a switchable linear voltage regulator.

In a further aspect of the invention, the external power supply is integrated together with the modem within a housing as a DC-Pack, separated from the appliance, but connectable to the appliance via a data cable and a DC power cable. The power save control provides a low power management for the DC-Pack for providing low power consumption, when the appliance is in an off mode or in a standby mode. The modem is switched on immediately by means of the power save control, when the appliance is switched to on mode, for providing minimum impact on home network service availability.

The system according to the present invention comprises an appliance and an external power supply with a modem, a power source and a respective power save control, wherein the appliance is coupled with the modem for receiving and/or transmitting data. The appliance is in a preferred embodiment a residential gateway or a set-top box coupled with the modem and the power source, and the modem is a power line communication modem.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

Figure 1:
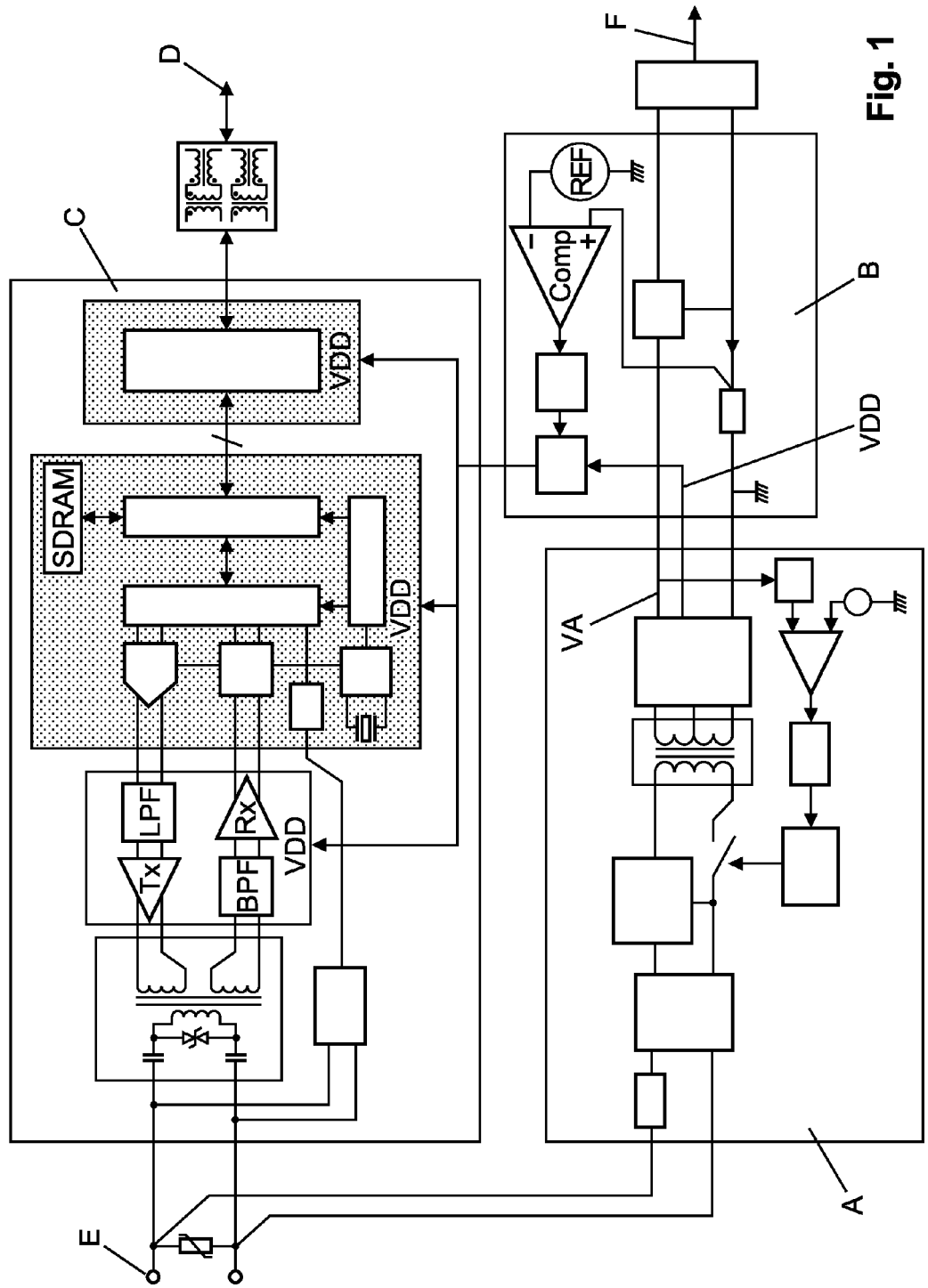
FIG. 1 an external power supply with a power source, a modem and a power save control for an appliance, FIG. 2 a preferred embodiment of the power save control of FIG. 1, FIG. 3 a preferred embodiment of the power source of FIG. 1, FIG. 4 a power line communication modem in accordance with FIG. 1, and FIG. 5 a timing diagram illustrating the operation of the power save control.

In FIG. 1 an external power supply is depicted comprising a modem C and a power source A providing an operating voltage VDD for the modem C and a supply voltage VA for an appliance, not shown. The modem C is coupled via a data cable D with the appliance for providing data transmission and/or reception. The modem C is switched on and off by a power save control B in accordance with an operating state of the appliance.

The power source A, power save control B and modem C are advantageously integrated together within a housing separated from the appliance, so that a compact appliance can be provided which can be easily customized to given mains voltages and data transmission standards. External power supplies of this kind are also known as DC-Pack. The modem C is in particular a power line communication modem coupled via an interface E to the appliance for providing data transmission and/or reception via the mains supply. The power source A acts as a DC/DC converter for providing a regulated DC supply voltage VA via cable F to the appliance.

Figure 2:
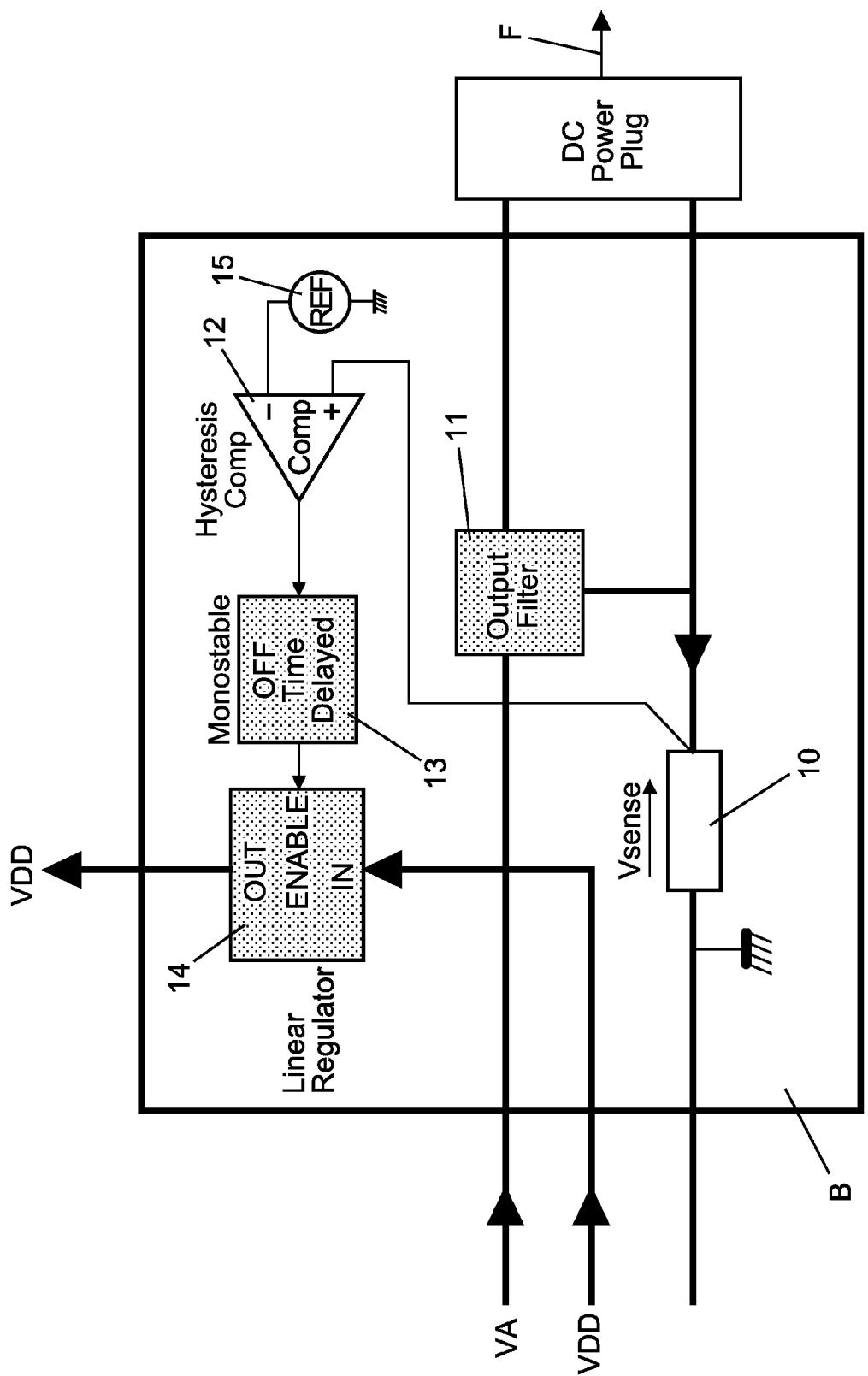

The power save control B, shown in more detail in FIG. 2, is a circuit comprising a current sense element 10 for sensing the supply current of the supply voltage VA coupled to the appliance. The power save control B comprises further a threshold circuit 12 coupled to the current sense element 10, for switching the operating voltage VDD for the modem C off, when the supply current for the appliance is below a threshold value, and for switching the operating voltage VDD for the modem C on, when the supply current is above a threshold value. The threshold values may be same or different.

In a preferred embodiment, the current sense element 10 comprises a resistor and the threshold circuit 12 a comparator coupled with a first input to a reference voltage 15 and with a second input to the current sense element 10 for sensing a voltage drop across the resistor. The comparator 12 may be in particular a hysteresis comparator having a first lower threshold value and a second higher threshold value.

The reference voltage 15 is adjusted in particular such that the operating voltage VDD for the modem C is switched off, when the appliance is in a standby mode or in an off mode. When the appliance is switched on, the comparator senses the higher supply current of the appliance and switches correspondingly the modem C on, so that the appliance is operative together with the modem within a short time, to provide data transmission and/or reception via modem C.

An output of the comparator 12 is coupled with a control input of a switch 14 for switching the operating voltage VDD for the modem on and off. In addition a timer circuit 13 is coupled between the output of the comparator 12 and the control input of the switch 14, e.g. a monostable gate circuit, for switching the modem off with a delay, so that short off states or short standby states of the appliance do not cause a switching off of the modem C. The switch 14 is for example a switchable linear voltage regulator. The power save control B comprises in addition an output filter 11 for providing a filtered supply voltage VA for the appliance.

Figure 3:
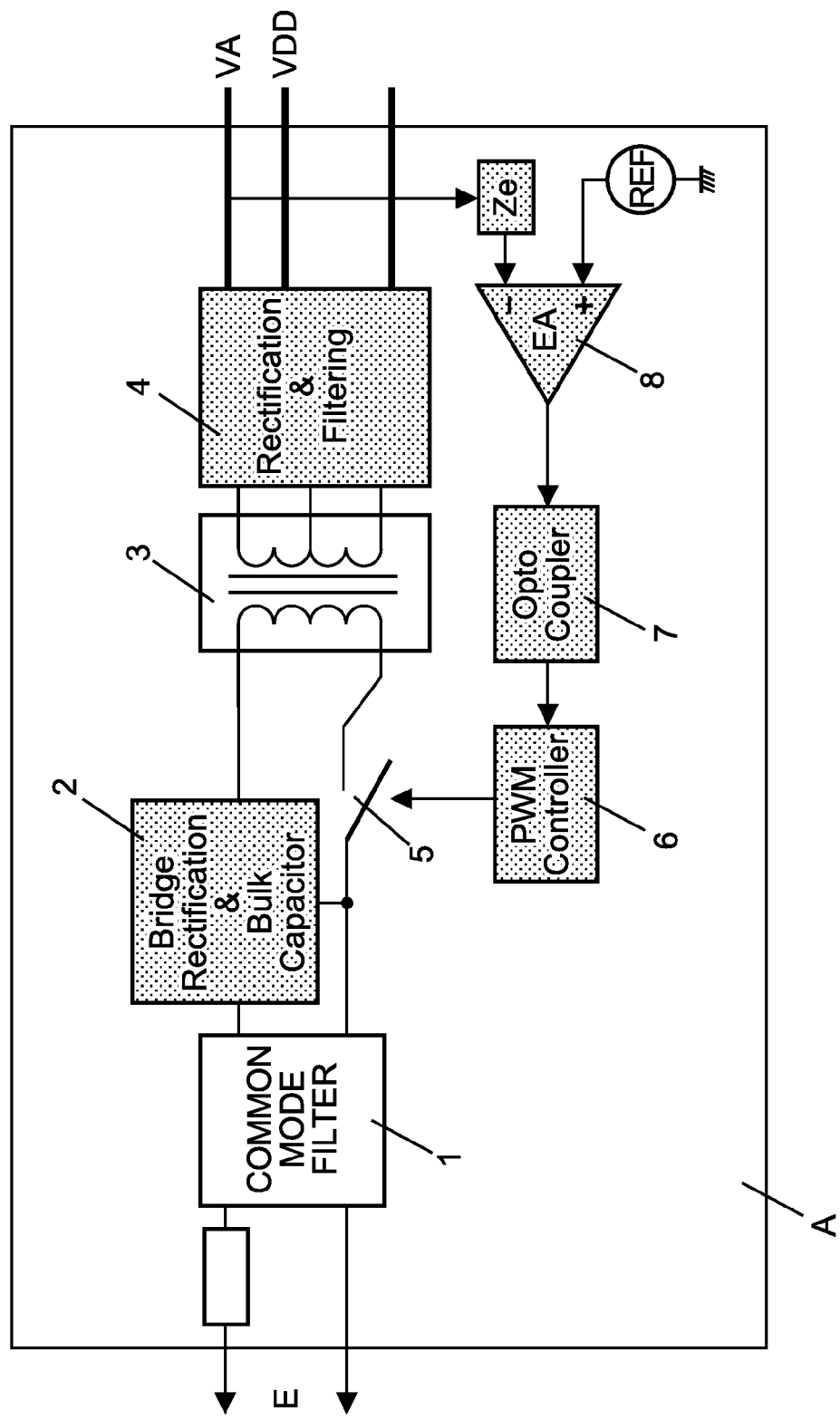

The power source A is in a preferred embodiment a switched mode power supply coupled with an input filter 1 to the mains plug E and comprises a rectifier and capacitor circuit 2 coupled between the input filter 1 and a primary winding of a transformer 3, as shown in FIG. 3. The transformer 3 comprises secondary windings coupled with an output section 4 for providing regulated DC voltages, operating voltage VDD and supply voltage VA. The switched mode power supply comprises in addition a switching transistor 5 being controlled by a PWM controller 6 and a feedback loop comprising an opto-coupler 7 and a comparator 8 coupled with an input to the supply voltage VA for stabilizing the output voltages VA and VDD.

Figure 4:
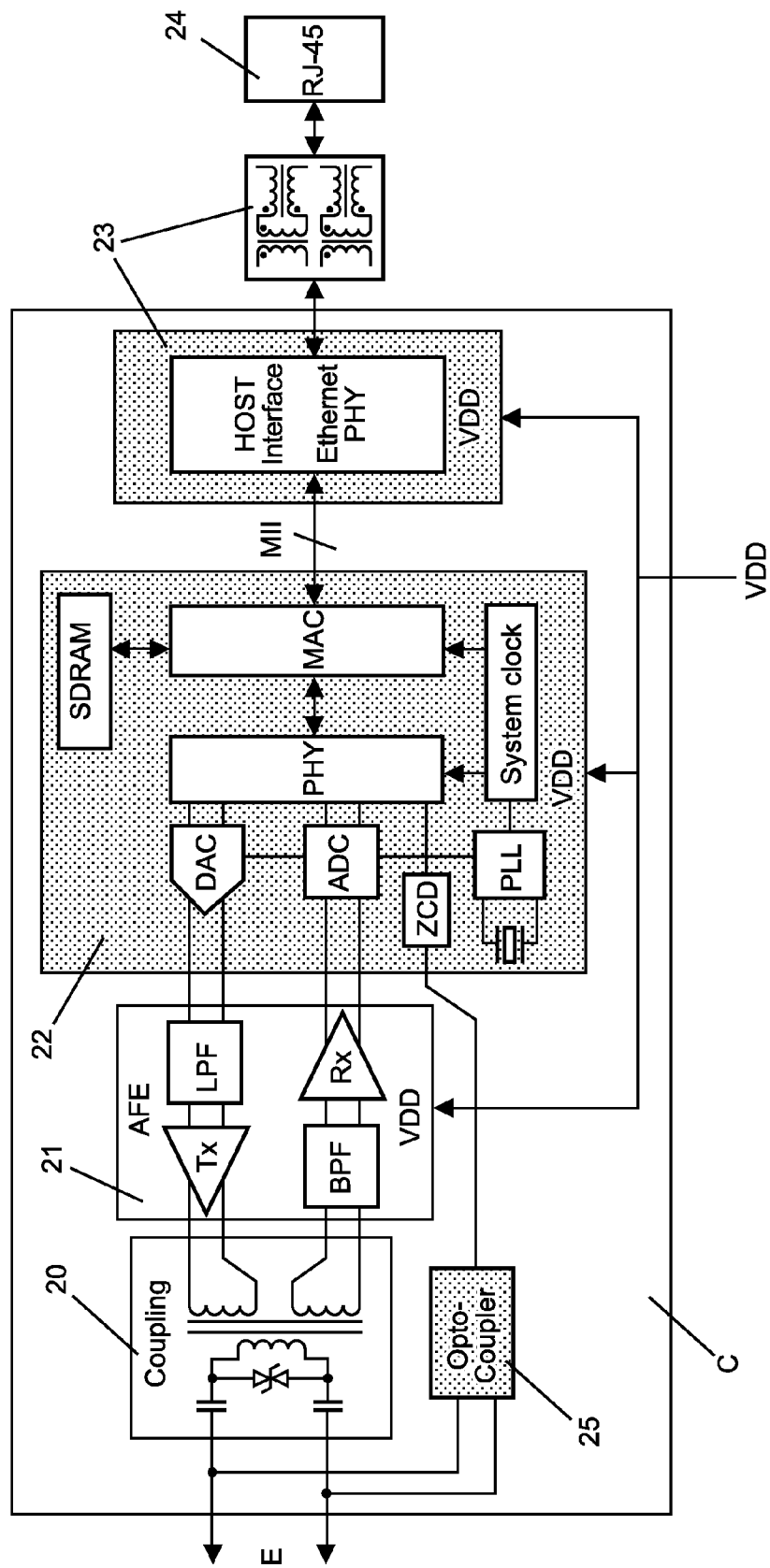

A preferred embodiment of the modem C is shown in FIG. 4. The modem C is a power line communication modem, which is coupled via a coupling transformer 20 with the mains plug E, shown in FIG. 1, for providing data communication via the mains line. To the coupling transformer 20 an analog transmit/receive section 21 is coupled comprising driver and receiver circuits acting as an interface between the coupling transformer 20 and a digital section 22. The digital section 22 provides digital modulation and demodulation of the data, as transmitted or received via analog transmit/receive section 21 to/from the mains line and via an interface 23 and a cable 24 to/from the appliance.

Sections 21-23 are switched on and off by means of the operating voltage VDD as provided via the power save control B from power source A. The modem C is in particular a standard module complying with current standards e.g. HPAV, UPA, HD-PLC or any new standards coming in the future.

Figure 5:
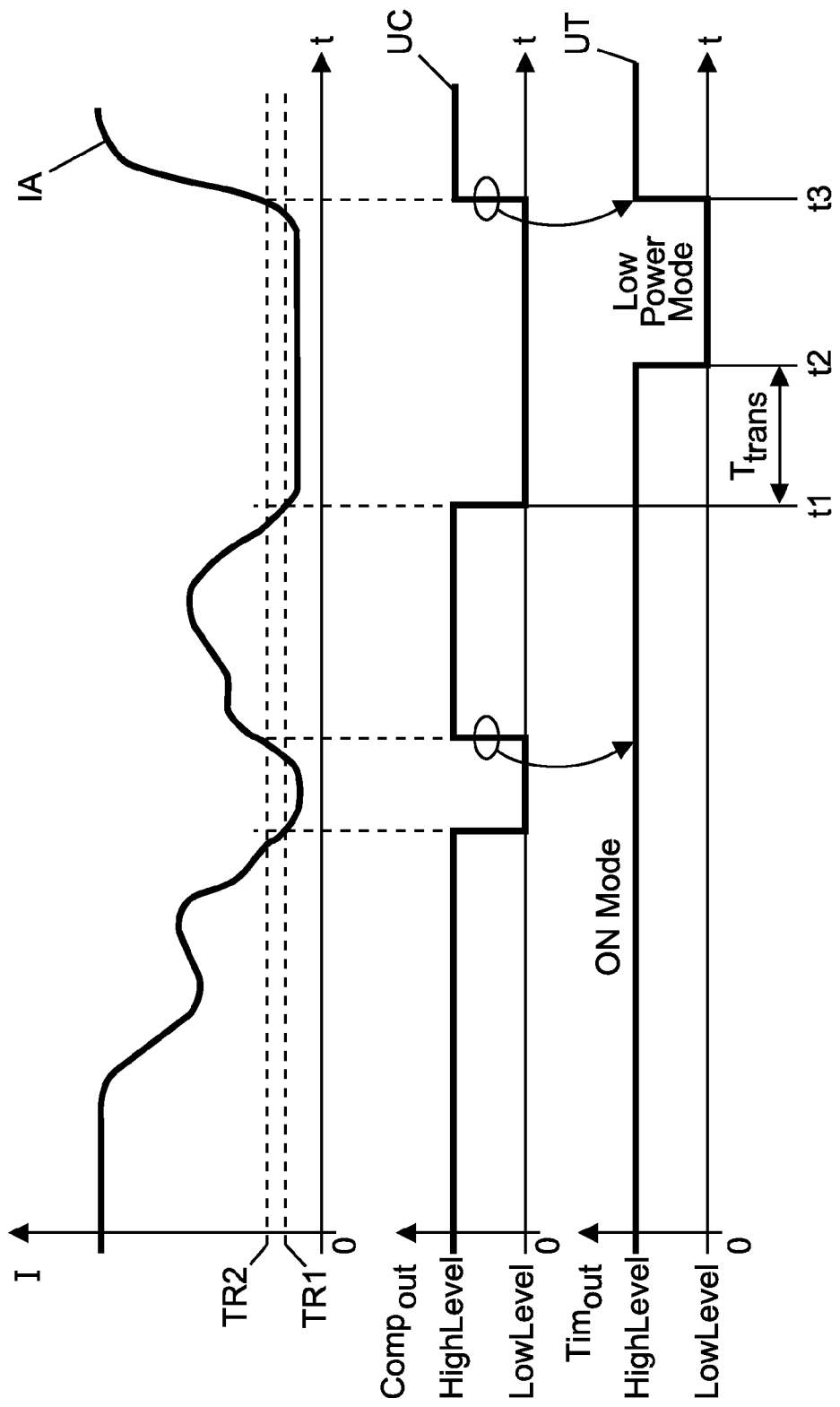

The modem C may have in addition also a low power standby mode for saving energy, when no data transmission is requested via cable 24 by the appliance, and no data are received via transformer 22 and analog section 21. The modem C goes back from the standby mode to the normal operating state when digital data on the mains line are detected via Opto-coupler 25 or via output section 23. A timing diagram illustrating the operation of the power save control B is shown in FIG. 5. Graph IA shows the current consumed by the appliance as a function of time t. The comparator 12 is in this embodiment a hysteresis comparator having a first lower threshold TR1 and a second higher threshold TR2, as indicated in FIG. 5. The comparator output voltage UC as a function of time t is shown below graph IA in FIG. 5 and is a function of the current IA and the thresholds TR1, TR2. When the current IA is below the first threshold TR1, the output of comparator 12 switches from high level to low level. The output of comparator 12 switches from low level to high level, when current IA increases above the second threshold TR2.

The voltage VDD provided by the power save control B to the modem C is further dependent on the timer circuit 13 coupled between comparator 12 and switching element 14, as indicated in FIG. 5. When the supply current IA is only for a short time interval below first and second thresholds TR1, TR2, the output voltage UT of timer circuit 13 remains high and therefore voltage VDD remains on for the modem C. Only when the appliance is in a standby mode or switched off for a longer time interval t1, t3, the output of timer circuit 13 switches the supply voltage VDD off after time t2, so that the modem C is completely switched off for the time interval t2-t3, therefore not consuming any energy. When the appliance is switched on at time t3, the supply voltage VDD is immediately switched on by the power save control B for enabling operation of the modem C.

The appliance is for example a digital set-top box or a residential gateway communicating via the modem C and the mains power line with corresponding other appliances. A system comprising the appliance and the external power supply as described above consume therefore only little energy when the appliance is in a standby modus or in off-mode, in agreement with new regulations regarding power consumption. In addition, the home networking connectivity is as good as if the modem C would be always in on-state. The power consumption for the user is fully optimized. A power consumption below 1 Watt can be easily obtained for the system, when the appliance is in off mode.

The foregoing embodiments and accompanying drawings are merely illustrative, but not limitative, and also other embodiments of the invention are within the scope of a person skilled in the art without departing from the spirit and scope of the present invention. The modem as described above is in particular not limited to a power line communication modem. The invention recites therefore in the claims herein after appended.

The invention claimed is:

1. A power supply for powering an appliance, the power supply comprising:
   a modem comprising a digital section for digital modulation and demodulation of data and an interface for providing at least one of data transmission and data reception between the modem and the appliance;
   a power source for providing a DC supply voltage for the appliance at a DC power plug that is separate from the interface, and for providing an operating voltage for the modem including the interface; and
   a power controller including a current sense element for sensing a supply current of the DC supply voltage for the appliance, and a threshold circuit coupled to the current sense element;
   wherein the threshold circuit is adapted to:
   sense the supply current of the DC supply voltage;
   enable the operating voltage for the modem including the interface to be switched off when the supply current for the appliance is below a first threshold value; and
   enable the operating voltage for the modem including the interface to be switched on when the appliance is switched on and the supply current is above a second threshold value; and
   wherein the modem switches to a low power standby mode when no data transmission is requested by the appliance and no data is received by the modem from a power line.

2. The power supply of claim 1, wherein the power controller comprises a switching element, to which an output of the threshold circuit is coupled for switching the modem including the interface on and off by switching the operating voltage for the modem on and off.

3. The power supply of claim 2, wherein the current sense element comprises a resistor, the threshold circuit comprises a comparator coupled to a reference voltage, and the switching element comprises a switchable linear voltage regulator.

4. The power supply of claim 1, wherein the power controller comprises a timer circuit for switching the modem including the interface off with a delay when the supply current for the appliance is below the first threshold value.

5. The power supply of claim 1, wherein the threshold circuit is adjusted such that the operating voltage for the modem including the interface is switched off when the appliance is in a standby mode or in an off mode.

6. The power supply of claim 1, wherein the modem is a power line communication modem.

7. The power supply of claim 1, wherein the power source is integrated together with the power controller and the modem within a housing as a DC-pack.

8. The power supply of claim 1, wherein the power source is a switched mode power supply for providing the operating voltage and the DC supply voltage.

9. A system comprising an appliance and a power supply with a modem according to claim 1.

10. The system of claim 9, wherein the appliance is a residential gateway or a set-top box.

11. The system of claim 9, wherein the appliance is coupled with the modem for at least one of receiving and transmitting data.

12. A power supply for powering an appliance, the power supply comprising:
   a modem comprising a digital section for digital modulation and demodulation of data and an interface for providing at least one of data transmission and reception between the modem and the appliance;
   a power source for providing an operating voltage for the modem including the interface and for providing a DC supply voltage for the appliance; and
   a power controller including a current sense element for sensing a supply current of the DC supply voltage for the appliance, and a threshold circuit coupled to the current sense element; wherein:
   the threshold circuit senses the supply current of the DC supply voltage;
   the operating voltage for the modem including the interface is switched off via the threshold circuit when the supply current for the appliance is below a first threshold value;
   the operating voltage for the modem including the interface is switched on via the threshold circuit when the appliance is switched on and the supply current is above a second threshold value; and
   the modem switches to a low power standby mode when no data transmission is requested by the appliance and no data is received by the modem from a power line.

13. The power supply of claim 12, wherein the power controller comprises a switching element, to which an output of the threshold circuit is coupled for switching the modem including the interface on and off by switching the operating voltage for the modem on and off.

14. The power supply of claim 13, wherein the current sense element comprises a resistor, the threshold circuit comprises a comparator coupled to a reference voltage, and the switching element comprises a switchable linear voltage regulator.

15. The power supply of claim 12, wherein the power controller comprises a timer circuit for switching the modem including the interface off with a delay when the supply current for the appliance is below the first threshold value.

16. The power supply of claim 12, wherein the threshold circuit is adjusted such that the operating voltage for the modem including the interface is switched off when the appliance is in a standby mode or in an off mode.

17. The power supply of claim 12, wherein the power source is integrated together with the power controller and the modem within a housing as a package.

18. The power supply of claim 12, wherein the power source is a switched mode power supply for providing the operating voltage and the DC supply voltage.

19. A method for providing a power supply for an appliance, the method comprising:
   providing a modem comprising a digital section for digital modulation and demodulation of data and an interface for providing at least one of data transmission and reception with the appliance;
   providing an operating voltage for the modem;
   providing a supply voltage for the appliance;
   sensing a supply current of the supply voltage;
   switching the operating voltage for the modem including the interface off if the supply current for the appliance is below a first threshold value;
   switching the operating voltage for the modem including the interface on if the appliance is switched on and the supply current is above a second threshold value; and
   switching the modem to a low power standby mode when no data transmission is requested by the appliance and no data is received by the modem from a power line.

20. The method of claim 19, wherein the operating voltage for the modem including the interface is switched off if the appliance is in a standby mode or in an off mode.

\* \* \* \* \*